(12) United States Patent
Gimbel et al.

(10) Patent No.: US 7,209,375 B2
(45) Date of Patent: Apr. 24, 2007

(54) METHOD AND APPARATUS FOR POSITIONING AN OPTICAL FIBER

(75) Inventors: Brian J. Gimbel, Horseheads, NY (US); James P. Luther, Hickory, NC (US); Thomas Theuerkorn, Hickory, NC (US); Hieu V. Tran, Charlotte, NC (US); Darrell Childers, Hickory, NC (US); Dennis M. Knecht, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 665 days.

(21) Appl. No.: 10/638,627

(22) Filed: Aug. 11, 2003

(65) Prior Publication Data

US 2004/0047567 A1    Mar. 11, 2004

Related U.S. Application Data

(62) Division of application No. 10/003,334, filed on Oct. 31, 2001, now Pat. No. 6,672,772.

(51) Int. Cl.
*G02B 6/38* (2006.01)

(52) U.S. Cl. ...................................... 365/60
(58) Field of Classification Search .................. 385/60, 385/80, 76, 77, 139
See application file for complete search history.

(56) References Cited

U.S. PATENT DOCUMENTS

| 4,378,954 A | 4/1983 | Baker .......................... 350/320 |
| 4,880,291 A | 11/1989 | Aberson, Jr. et al. .... 350/96.21 |
| 5,854,852 A | 12/1998 | Csipkes et al. ............. 382/151 |
| 5,862,250 A | 1/1999 | Csipkes et al. ............. 382/141 |
| 6,007,258 A | 12/1999 | Marchitto et al. ............ 385/85 |
| 6,011,616 A | 1/2000 | Volcy et al. ................ 356/73.1 |
| 6,287,018 B1 | 9/2001 | Andrews et al. .............. 385/60 |

FOREIGN PATENT DOCUMENTS

| DE | 3340972 A1 | 5/1985 |
| DE | 4025380 C1 | 10/1991 |
| EP | 0637764 A1 | 2/1995 |
| EP | 1241500 A2 | 9/2002 |
| GB | 1445141 | 9/1973 |
| JP | 60-149003 | 8/1985 |

(Continued)

*Primary Examiner*—Javaid H. Nasri
(74) *Attorney, Agent, or Firm*—Jeffrey S. Bernard (57) ABSTRACT

Eccentricity of a optical fiber installed in a passageway of a ferrule is minimized by imposing a force on the end of the optical fiber projecting from the passageway at the ferrule end face to push the optical fiber to a desired position in the passageway, prior to curing an adhesive used for fixing the optical fiber in the passageway, so as to compensate for eccentricity of the passageway. In one embodiment, the force is imposed on the optical fiber by hanging a weight on the optical fiber. In another embodiment, the force is imposed on the optical fiber by using a pressurized jet of fluid. The point of application of the force, the magnitude of the force, and the viscosity of the adhesive are selected such that minimal optical fiber bending occurs, thereby assuring that the optical fiber is positioned at the desired position in the passageway for an appreciable distance from the ferrule end face along the passageway.

8 Claims, 8 Drawing Sheets

FOREIGN PATENT DOCUMENTS

| | | | | | |
|---|---|---|---|---|---|
| JP | 63-204204 | 8/1988 | JP | 64-37510 | 2/1989 |
| JP | 64-35404 | 2/1989 | JP | 5-307130 | 11/1993 |
| | | | JP | 6-109944 | 4/1994 |
| | | | WO | WO00/29889 | 5/2000 |

METHOD AND APPARATUS FOR POSITIONING AN OPTICAL FIBER

This application is a divisional of U.S. patent application Ser. No. 10/003,334 filed Oct. 31, 2001 now U.S. Pat. No. 6,672,772.

FIELD OF THE INVENTION

This invention relates generally to method and apparatus for positioning an optical fiber. More particularly, this invention relates to a method and apparatus for positioning an optical fiber in a passageway formed through a ferrule of an optical fiber connector in such a way as to compensate for eccentricity of the passageway relative to the longitudinal axis of the ferrule such that the optical fiber position relative to the passageway is substantially straight for a predetermined distance.

BACKGROUND OF THE INVENTION

The transmission of communication signals for voice, video, data, and the like, is increasingly accomplished using optical fibers because of the high bandwidth and throughput capabilities they offer in comparison with conventional electrical conductors. Unlike connections for electrical conductors, however, the fiber optic connections must be executed with great care and precision in order to minimize losses in the transmitted signal. As is known in the art, two optical fibers are connected by bringing the end faces of the optical fibers into coaxial alignment such that the optical fiber end faces abut or are separated by only a slight distance. In this way, the two optical fibers form a substantially continuous waveguide to transmit signals. Typically, each optical fiber is mounted in a passageway (e.g., a bore, channel, groove, or any other similar structure) formed through a ferrule, which may be a cylindrical or non-cylindrical shaped body made of material, such as, ceramic or plastic.

The ferrule is usually mounted in a body of an optical fiber connector that is configured to mate with another connector also having a ferrule mounted therein. The connectors are configured so as to coaxially align the ferrules and the optical fibers therein. For example, an SC ferrule may be configured such that the bore in each ferrule is nominally centered, relative to the outer surface thereof.

The degree of precision with which the optical fibers are aligned with each other affects the performance of the connection between two optical fibers. Several factors can affect the loss or attenuation of signal caused by the connection including: (1) lateral displacement of the mating end faces of the optical fibers, that is, the lateral distance between the two axes of the optical fibers at the mating end faces thereof; (2) angular misalignment of the optical fibers; and (3) axial separation between the end faces of the optical fibers. Other factors that can affect the loss or attenuation of signal at a fiber-to-fiber interconnection include: index of refraction mismatch, mode field radius mismatch, the shape and finish of the end faces, and physical damage that may be present at the end faces.

Of these factors, lateral displacement and angular misalignment have significant impact on the signal attenuation. Lateral displacement or offset of the optical fibers of two mated connectors can result from various causes. Two important causes are: (1) eccentricity of the passageway of the ferrule relative to the ferrule's outer surface; and (2) offset of the optical fiber within the passageway. With regard to the latter, the passageway in the ferrule typically is slightly larger in diameter than the optical fiber, and hence, until the optical fiber is fixed in position in the passageway via an adhesive, the optical fiber is free to move in the passageway. Accordingly, the eccentricity of the optical fiber relative to the ferrule can be higher or lower depending on where the optical fiber is secured in the passageway.

It is known to take advantage of this ability of the optical fiber to move in the passageway so as to minimize the eccentricity of the optical fiber in a ferrule whose passageway is not perfectly centered or aligned in the ferrule. In general, even when care is taken to try to form the passageway in the exact locations of the ferrule (e.g., center of the ferrule), the passageway is usually offset from the central axis of the ferrule to some extent. The offset, or eccentricity, of the passageway is generally characterized by two parameters, the magnitude of the offset and the direction of the offset, both parameters being measured at the end face of the ferrule.

For example, the eccentricity of a ferrule having a central bore may have a magnitude of 1 µm and this offset may be in the direction of a radial line that can be designated as the 0° position. As noted above, it is known to minimize the eccentricity of an optical fiber disposed in an eccentric passageway by positioning the optical fiber in a particular direction in the passageway. Thus, for instance, in the example given above, the optical fiber can be positioned to one side of the passageway in the direction of a radial line that is displaced 180° from the radial line along which the passageway is offset. In this manner, the eccentricity of the optical fiber, which would be 1 µm if the optical fiber were exactly centered in the passageway, is reduced by half the difference between the diameter of the passageway and the diameter of the optical fiber. Thus, assuming for illustrative purposes that the passageway has a diameter of 126 µm and the optical fiber has a diameter of 125 µm, the eccentricity of the optical fiber can be as low as 0.5 µm if the optical fiber is positioned to the side of the passageway in the opposite direction to that in which the passageway is offset. In contrast, if the optical fiber were positioned to the side of the passageway in the same direction to that in which the passageway is offset, then the optical fiber eccentricity would be 1.5 µm.

U.S. Pat. No. 4,880,291 discloses an apparatus and method for positioning an optical fiber within a passageway of a ferrule in a predetermined orientation with respect to the direction of eccentricity of the passageway relative to the longitudinal axis of the ferrule. The apparatus has a plurality of receptacles or nests for receiving a plurality of connector bodies each having a ferrule with an optical fiber inserted in a bore thereof. The ferrule in each connector body is rotationally oriented such that the direction of eccentricity of the bore in the ferrule is diametrically opposite to the direction of a protruding tab formed on the outer surface of the connector body. Each nest in the apparatus has a keyway for mating with the tab on the connector body, such that the connector body is oriented in a known manner in the nest. The apparatus includes a plurality of wire-like bails that press against the optical fibers projecting from the ferrules so as to force the optical fibers to the side of the bores in the direction of the tabs on the connector bodies, thus minimizing the optical fiber eccentricity. An adhesive in the bores is then cured to fix the optical fibers in place.

Figure 1:
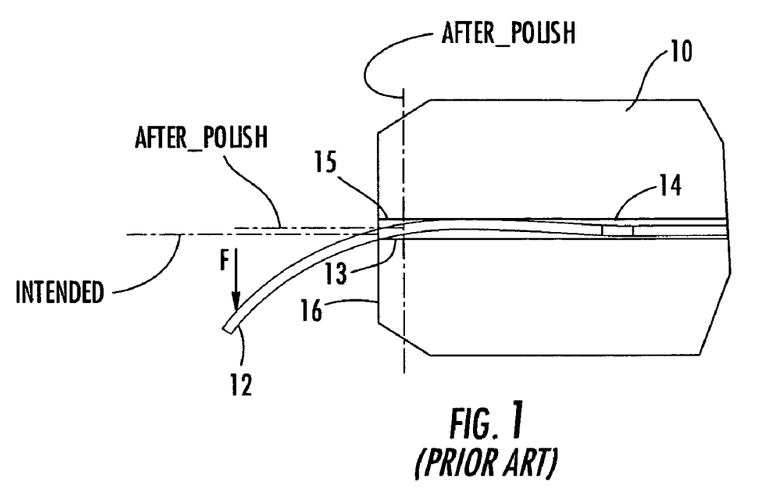
FIG. 1 is a diagrammatic view of a ferrule illustrating bowing of an optical fiber in a bore, as can occur with prior art positioning methods.

Although a general method of pushing an optical fiber to one side of the passageway is thus known, the prior art does not provide any guidance on how best to accomplish the method. In practice, it has been found that pushing an optical fiber to a preferred position, such as, to one side of the passageway, can improve the eccentricity of the optical fiber at the end face of the ferrule. However, as illustrated in FIG. 1, which is shown in exaggerated detail for illustrative purposes, the force exerted on the optical fiber to push it to one side of the passageway can cause the optical fiber to bend or bow. When the end of the optical fiber is cut off and the end faces of the optical fiber and ferrule are polished, the optical fiber and ferrule material are removed for some axial distance back from the original end face of the ferrule, as illustrated in FIG. 1 by the broken line representing the position of the end face of the ferrule and optical fiber after polishing. As a result, the optical fiber position relative to the passageway after polishing can differ appreciably from the optical fiber position prior to polishing. In addition, attenuation is caused by the angular misalignment of the mating passageways. As illustrated in FIG. 1, due to the fiber bend, an angular misalignment of the optical fiber axis relative to the ferrule axis exists.

Thus, a need exists for a method and apparatus for positioning an optical fiber in a passageway to compensate for eccentricity of the passageway relative to the longitudinal centroidal axis of the ferrule such that the optical fiber position relative to the passageway is substantially straight for a distance back from the ferrule end face that is at least as great as the distance representing the maximum length of material that will be removed during polishing.

SUMMARY OF THE INVENTION

This invention addresses the above needs by providing a optical fiber positioning apparatus and method that reduces the amount of optical fiber bending caused when an optical fiber is pushed in a particular direction in the passageway. Consequently, the position of the optical fiber is substantially straight for an appreciable distance back from the end face of the ferrule so that the optical fiber is still in the desired position in the passageway even after polishing of the optical fiber and ferrule. As used herein, the term "passageway" includes encapsulated passageways (e.g., bores and similar structures), non-encapsulated passageways (e.g., channels, grooves, and similar structures), and combinations thereof. As used herein, the term "ferrule" includes cylindrical and non-cylindrical ferrules housing a single fiber, such as, for example, SC, LC, MU, BLC and other similar ferrules.

In accordance with one embodiment, a method of positioning an optical fiber in a passageway of a ferrule involves applying a fluid adhesive in the passageway of the ferrule, and subsequently inserting an optical fiber into the passageway of the ferrule such that an end portion of the optical fiber projects out from the passageway beyond the end face of the ferrule, the optical fiber having a diameter less than that of the passageway. A force F is imposed on the end portion of the optical fiber projecting from the ferrule, in a direction generally orthogonal to the longitudinal axis of the passageway, the force having sufficient magnitude to overcome viscosity of the fluid adhesive and to position the optical fiber in the passageway as to compensate for eccentricity of the passageway such that the optical fiber position relative to the passageway is substantially straight for a predetermined distance. In contrast to prior methods, bowing of the optical fiber in the passageway is minimized by imposing the force F at a distance D from the end face such that the resulting moment (F·D) exerted on the optical fiber maintains the axis of the optical fiber straight within at least about 0.025 µm for a distance of at least about 100 µm from the end face into the passageway. Accordingly, up to about 100 µm of material (ferrule, optical fiber, and adhesive) can be removed during polishing and yet the optical fiber position after polishing will be within at least about 0.025 µm of the same position before polishing.

In an embodiment, the force is imposed on the optical fiber by orienting the optical fiber generally horizontally and hanging a weight on the end portion of the optical fiber projecting out of a passageway. The weight preferably is located on the optical fiber at a distance of at least about 0.5 mm from the end face of the ferrule, more preferably about 0.5 to 1.0 mm, and weighs about 0.1 to 5.0 grams, more preferably about 0.3 to 0.5 grams.

In an embodiment, an apparatus for positioning an optical fiber includes a fixture defining at least one receptacle, and preferably a plurality of receptacles, each for receiving and holding a ferrule having an optical fiber extending therefrom. The apparatus includes a weight for each receptacle in the holder, each weight being configured to rest on an end portion of the optical fiber projecting from the ferrule in the corresponding receptacle so as to impose a downward force on the optical fiber. A weight positioning mechanism of the apparatus is structured and arranged to lower each weight from a raised position disengaged from the corresponding optical fiber to a lowered position resting on the optical fiber. The entire apparatus can be placed in an oven to cure the adhesive in the passageways of the ferrules. In alternative embodiments, the adhesive may be cured by other suitable curing techniques, such as, for example, UV and the like.

In an embodiment, a new curing method and apparatus directs a low energy beam of laser radiation at the end portion of the optical fiber extending from the end face of the ferrule. The low energy beam heats the end portion of the fiber and heat conducts along the fiber extending into the passageway. As the heat conducts along the fiber extending into the passageway, the adhesive is cured under the heat impact. Thereafter, a high energy laser beam may cut the optical fiber flush with the adhesive. Alternatively, the optical fiber may be cut during polishing of the end face of the ferrule.

In an embodiment, the force for pushing the optical fiber to a desired position, such as, to one side of the passageway, is imposed by directing a pressurized fluid, preferably air, against the optical fiber in a direction generally orthogonal to the longitudinal axis of the passageway. The air preferably impacts the optical fiber at a location in close proximity to the end face of the ferrule. Alternatively, the pressurized fluid may impact the optical fiber at a plurality of locations along the optical fiber axis. Once the optical fiber has been positioned, the optical fiber is secured in place by curing the adhesive.

In a preferred embodiment, a beam of laser radiation is impinged on the end face to heat the adhesive and to, thereby, at least partially cure the adhesive in the portion of the passageway adjacent the end face, thus tacking the optical fiber at the end face of the ferrule after the optical fiber has been positioned as described above. The adhesive can then be fully cured along the entire passageway by heating the assembly in an oven or by any other suitable curing technique.

Further, this invention may make use of a method and apparatus that provide a work station incorporating at least one of the following: (1) fiber placement into the passageway of a ferrule, (2) adhesive injection into the passageway of the ferrule, (3) fiber positioning in such a way as to compensate for eccentricity of the passageway relative to the longitudinal centroidal axis of ferrule such that the optical fiber position relative to the passageway is substantially straight for a predetermined distance, (4) tacking the end portion of the fiber to the end face of the ferrule, (5) curing the adhesive in the passageway of the ferrule, (6) cutting off the end portion of the fiber projecting from the end face of the ferrule, and (7) polishing the end face of the ferrule and optical fiber.

BRIEF DESCRIPTION OF THE DRAWINGS

The above and other embodiments, objects, features, and advantages of the invention will become more apparent from the following description of certain preferred embodiments thereof, when taken in conjunction with the accompanying drawings in which.

DETAILED DESCRIPTION OF THE INVENTION

This invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1, as previously discussed, illustrates the effect of directing an end portion of an optical fiber 12 to desired position in a bore 14 of a ferrule 10. The optical fiber 12 is shown installed in the bore 14 of the ferrule 10. A force F is applied to the optical fiber 12, downward in FIG. 1, to push the optical fiber 12 to a lower side 13 of the bore 14. The optical fiber 12 is thus subjected to a bending moment that causes the optical fiber 12 to bend towards an upper side 15 of the bore 14 as shown; the degree of bending is exaggerated in the drawing for clarity of illustration. If the optical fiber 12 is tacked at an end face 16 at the lower side 13 and ferrule 10 is polished so as to remove material back to the broken line in FIG. 1, then the resulting end portion of the optical fiber 12 will no longer be at the lower side 13 of the bore 14 because of the bowed shape of the optical fiber 12. This invention seeks to overcome this problem.

FIGS. 2–7 depict an optical fiber positioning apparatus 20 in accordance with an embodiment of this invention. This apparatus includes a housing formed by a plate-shaped bottom wall 22, a plate-shaped strong back 24 overlying the bottom wall, a shell 26 configured as a shallow box mounted atop the strong back 24, and a base plate 28 mounted with the shell 26 atop its bottom wall 22. A connector tray assembly 30 and a curing block assembly 40 are mounted within the shell 26 atop the base plate 28. The connector tray assembly 30 includes a horizontally slidable tray 31 having an upstanding wall 32 in which a plurality of connector-receiving notches or cut-outs 34 are formed spaced apart along the length of the wall 32. Aligned with the notches 34 are a plurality of connector receptacles 44 formed in a curing block 42 of the curing block assembly 40.

Figure 2:
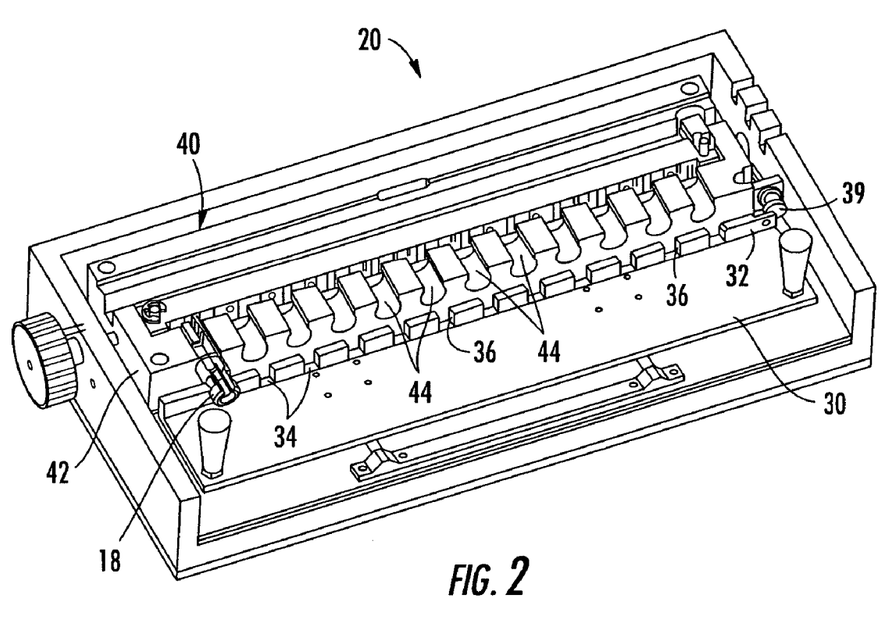
FIG. 2 is a perspective view of an apparatus for mounting a plurality of fiber optic connectors to position and to secure an optical fiber in a ferrule of each connector in accordance with an embodiment of this invention.
Figure 3:
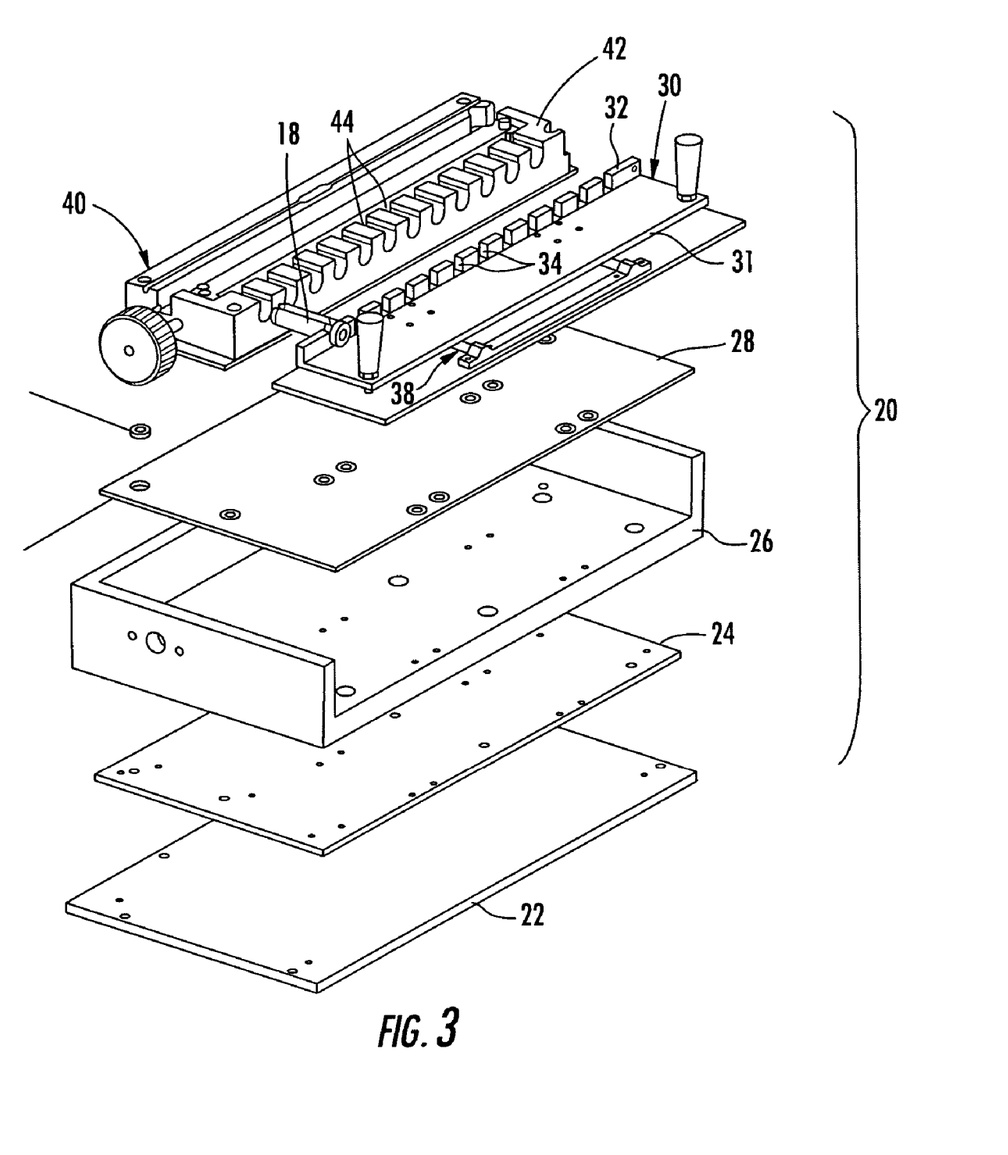
FIG. 3 is an exploded view of the apparatus of FIG. 2.

Each notch 34 in the connector tray wall 32 is preferably configured to receive the outer housing 18 of a fiber optic connector. In alternate embodiments (not shown), each notch 34 could be configured to receive any portion of the fiber optic connector. Further, although the fiber optic connector may include a variety of single fiber ferrules with differently configured passageways (e.g., bores, channels, grooves, etc.), including SC, LC, MU, BLC, and similar ferrules, the housing 18 of the illustrated embodiment is shown as an SC connector by way of example, but not of limitation. As such, the SC connector will be hereinafter described with reference to the apparatus and method of this invention. The housing 18 has a generally cylindrical outer surface in which a groove is formed such that the groove defines a pair of flats 19 on opposite sides of the housing 18 parallel to each other for interfacing with walls 36 of the notches 34 in the wall 32 of the connector tray 31. As a result of a close-fitting interaction between the walls 36 of the notch 34 and the flats 19 of the groove in the connector housing 18, the connector housing 18 can be inserted into the notch 34 in only one rotational orientation. The ferrule 10 is mounted in the housing 18 such that when the connector is inserted into the notch 34 in the direction of eccentricity of the bore 14 in the ferrule 10 of the connector is straight upward. In practice this would be accomplished by measuring the magnitude and direction of eccentricity of the bore 14 in the ferrule 10, mounting the ferrule 10 in an inner housing 11 of the connector such that the direction of eccentricity of the bore 14 is in a predetermined orientation with respect to the inner housing 11, and then mounting the inner housing 11 in the outer housing 18 in a predetermined orientation. Of course, in a type of connector having the ferrule mounted directly in an outer housing (i.e., not having an inner housing), the ferrule would be mounted in the outer housing in a predetermined orientation. This can be achieved, for example, by forming a keyway in the ferrule in a predetermined position with respect to the direction of eccentricity of the passageway for engaging a key formed in the housing or in any other suitable way. The particular technique with which the ferrule is mounted in the connector to position the direction of eccentricity in the desired orientation is not important to this invention.

The curing block 42, as noted, defines receptacles 44 for receiving the connectors. The receptacles 44 are cylindrical in configuration, with a slightly larger diameter than the outer diameter of the housings 18 of the connectors, such that the connectors can be slid axially into the receptacles 44. The tray 31 of the connector tray assembly 30 in which the connectors are held is slidable axially relative to the receptacles 44 of the curing block 42, via a slide arrangement 38. Once the connectors are mounted in the connector tray assembly 30, the tray 31 is slid toward the curing block 42, thereby inserting the connectors into the receptacles 44 of the curing block 42, until the tray 31 abuts a stop 39 that is positioned such that the end faces of the ferrules and optical fibers are in a desired axial location relative to the positioning assembly of the apparatus as further described below.

In an embodiment, the positioning assembly comprises the weight assembly depicted in detail in FIGS. 4–7. The weight assembly includes a lifting bar 46 of elongate form extending parallel to and spaced from the row of receptacles 44. For each receptacle 44 in the curing block 42, a pair of weight supports 48 extend from the lifting bar 46 toward the receptacle 44 and are spaced on opposite sides of a central axis of the respective receptacle 44. The weight supports 48 in the illustrated embodiment are configured as cylindrical rods, at the free ends of which an annular groove is formed. A plate-shaped weight 50 having a pair of slots 52 slightly wider than the diameter the weight supports 48 in the region of the annular grooves is hung on each pair of weight supports 48 such that the slots 52 engage the grooves of the weight supports 48. The slots 52 are narrower than the full diameter of the weight supports 48; thus, the weights 50 are constrained to remain in the grooves at the free ends of the weight supports 48. Each weight has an aperture 54 therethrough for receiving the optical fiber 12.

Figure 7:
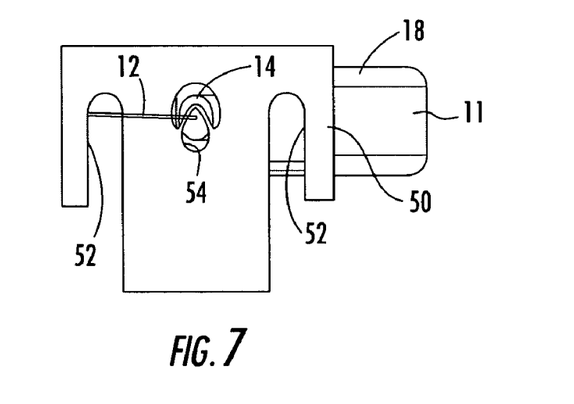
FIG. 7 is an enlarged perspective view of the weight shown in FIG. 6, viewed generally from in front of the weight showing the end portion of the optical fiber extending from the fiber optic connector.

The lifting bar 46 is vertically movable between raised and lowered positions. In the raised position, the lifting bar 46 and weight supports 48 thereof lift the weights 50 so that they do not bear on the optical fibers 12 of the connectors; this position of a weight 50 is depicted in FIG. 7. In the lowered position of the lifting bar, the weights 50 are lowered so that they are supported by the optical fibers 12. The weights thus exert a downward force on the optical fibers that push the optical fibers to the lower sides 13 of the bores 14 in the ferrules 10. In an embodiment, the weights 50 have a mass of about 0.1 to 5.0 grams each, more preferably about 0.3 to 0.5 grams each, and are positioned at least about 0.5 mm from the end faces of the ferrules 10, more preferably about 0.5 to 1.0 mm. Accordingly, the bending moment exerted on a optical fiber by a weight 50 is less than about $4.9 \times 10^{-5}$ N-m, more preferably is less than about $1 \times 10^{-5}$ N-m, and most preferably is less than about $3.9 \times 10^{-6}$ N-m, where the lever arm of the moment is measured from the ferrule end face 16 to the point along the optical fiber at which the weight is supported. It should be noted that although it is desirable to position the weight as close to the end face of the ferrule as possible in order to minimize the bending moment on the optical fiber, if the weight 50 is positioned too close to the end face of the ferrule, then the weight could become adhered to the ferrule because adhesive from the bore may be present at the end face. Thus, for this reason it is advantageous to provide a slight separation (e.g., from about 0.5 mm to about 1.0 mm) between the ferrule end face and the weight.

It has been found that when this arrangement is used in combination with an adhesive of suitable viscosity at the temperature prevailing when the weights 50 are hung on the optical fibers 12 (i.e., generally room temperature), the optical fibers are positioned to lower sides 13 of the bores 14 in the ferrules 10 with substantially no bending of the optical fibers taking place. In particular, the axis of the optical fiber remains straight from about 0.025 μm to about 0.05 μm for a distance of at least about 50 μm along the bore from the ferrule end face. Preferably, an epoxy adhesive is used for securing the optical fibers in the passageway, and the adhesive preferably has a viscosity of less than about 27,000 cps at room temperature, and more preferably, of about 27,000 cps at room temperature. However, the invention can be practiced with various adhesives having a wide range of viscosities. The important consideration is to select the mass of the weight, the point of application of the weight (i.e., the axial distance from the ferrule end face to the weight), and the adhesive viscosity such that the weight is heavy enough to exert a downward force on the optical fiber to overcome the viscous forces of the adhesive, but not so heavy that a substantial amount of optical fiber bending occurs. It will be appreciated that various combinations of weight, distance from the ferrule end face, and adhesive viscosity may be employed to achieve this objective.

Figure 4:
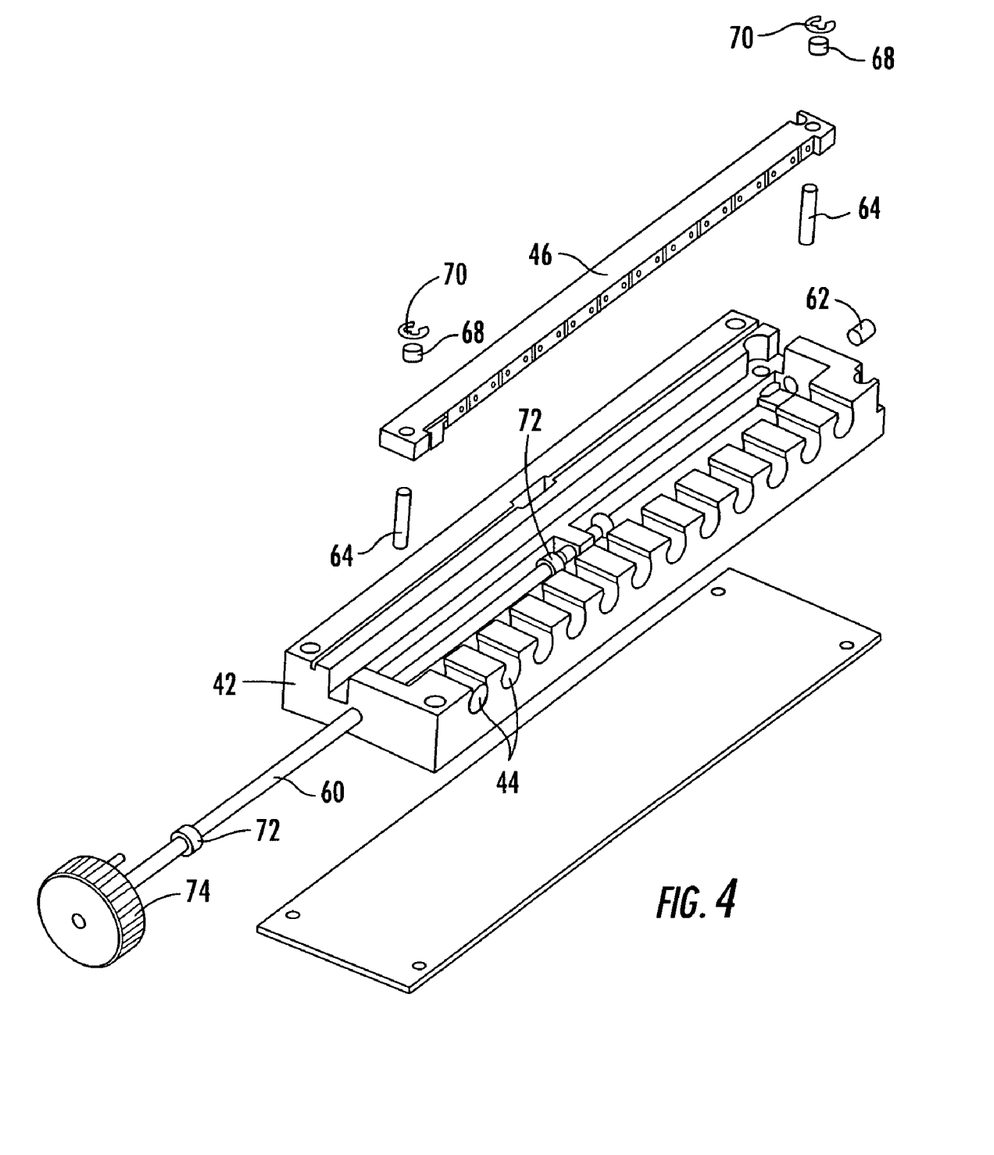
FIG. 4 is an exploded view of a portion of the apparatus of FIG. 2, showing details of the weight positioning mechanism.
Figure 5:
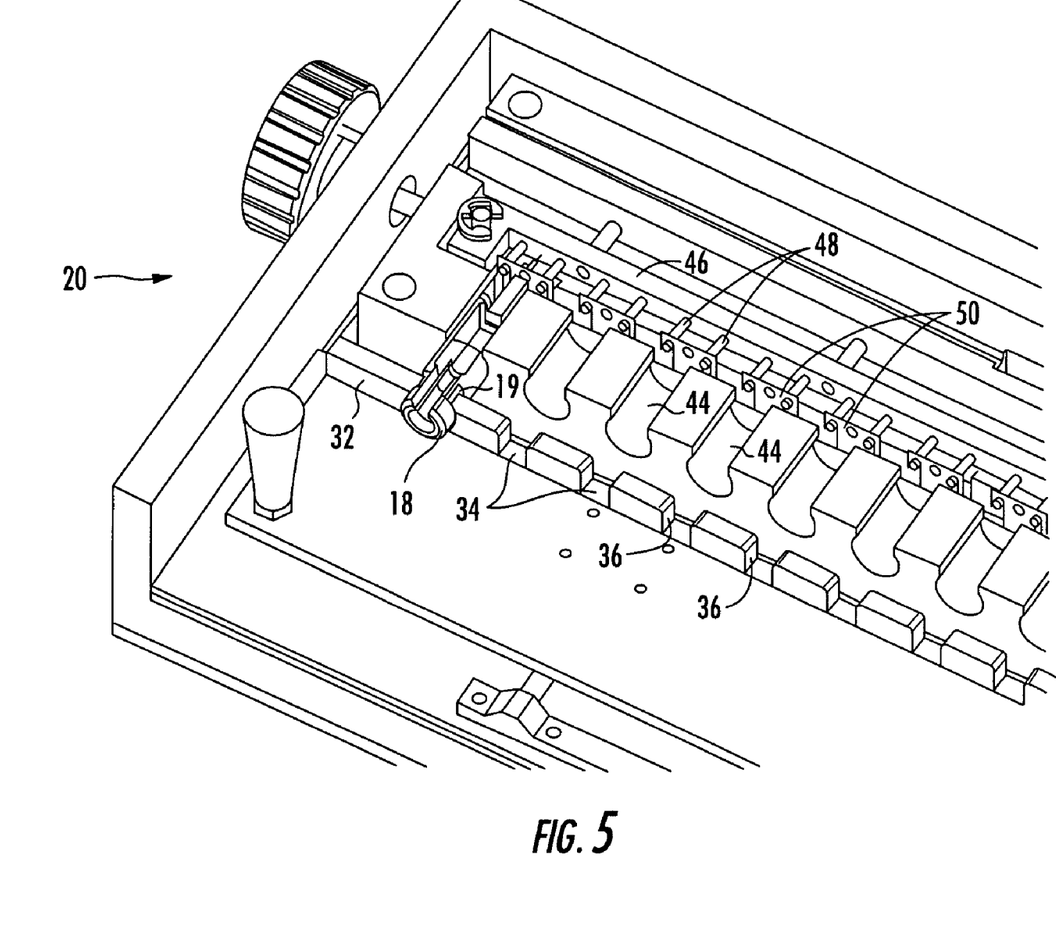
FIG. 5 is an enlarged partial perspective view showing a fiber optic connector mounted in the apparatus of FIG. 2, viewed generally from above and to the rear of the fiber optic connector.
Figure 6:
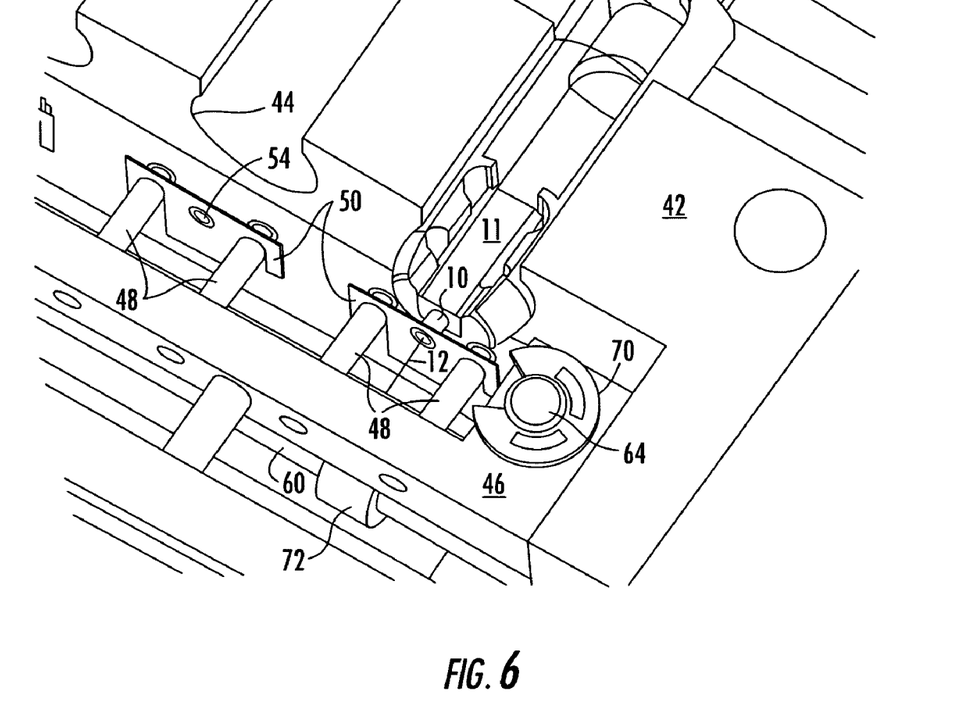
FIG. 6 is a further enlarged partial perspective view of a fiber optic connector mounted in the apparatus of FIG. 2, viewed generally from above and from in front of the fiber optic connector.

The lifting bar 46 of the apparatus is raised and lowered by an actuating mechanism that includes an actuating rod 60 rotatably supported in the curing block 42 via bearings 62 (only one visible in FIG. 4). The actuating rod 60 extends parallel to the row of receptacles 44 in the curing block 42 and is disposed beneath the lifting bar 46. The lifting bar 46 is slidably engaged with a pair of vertical guide posts 64 secured in the curing block 42, such that the lifting bar 46 slides up and down without substantially pivoting or rocking (i.e., the lifting bar 46 undergoes a substantially pure translation). The guide posts 64 extend through apertures 66 in the lifting bar 46, and upper ends of the guide posts 64 extend above the lifting bar 46. Coil compression springs 68 are slipped over the upper ends of the guide posts 64 and are held in a compressed condition bearing against the upper surface of the lifting bar 46 by a pair of E-clips 70. Thus, the springs 68 urge the lifting bar 46 toward its lowered position in which the weights 50 are hung on the ends of the optical fibers 12 of the connectors. The lifting bar 46 is raised in opposition to the spring forces by a pair of eccentric cams 72 mounted on the actuating rod 60. A knob 74 secured to the end of the actuating rod 60 that extends out one side of the curing block 42 and out one side of the shell 26 is used to turn the actuating rod 60 so as to cause the cams 72 to lift the lifting bar 46 up. The lifting bar 46 is fixed in its uppermost position by a catch mechanism (not shown) for the actuating rod 60.

In use, the apparatus 20 is prepared for operation by turning the knob 74 to raise and fix the lifting bar 46 in its raised position. The tray 31 of the connector tray assembly 30 is slid axially away from the receptacles 44 of the curing block 42 so that connectors can be inserted into the notches 34 in the tray 31. The connectors are prepared by injecting liquid adhesive into the bores 14 in the ferrules 10, and inserting an optical fiber 12 into each bore 14 such that the optical fiber end projects from the end face 16 of the ferrule 10. Once the connectors are mounted in the notches, the tray 31 is slid toward the curing block 42, thereby inserting the connectors into the receptacles 44 of the curing block, until the tray 31 abuts the stop 39. In this position of the tray 31, the end faces of the ferrules preferably are spaced approximately from about at least about 0.5 mm to 1.0 mm from the weights 50 in the axial direction, and the optical fibers 12 of the connectors are inserted through the apertures 54 in the weights but there is no contact between the weights 50 and the optical fibers 12. Next, the knob 74 is rotated to lower the lifting bar 46 to its lower position, thereby lowering the weights 50 onto the optical fibers 12. The optical fibers 12 are thus pushed down toward the lower sides 13 of the bores 14 in the ferrules 10. The entire apparatus 20 is then placed in an oven to cure the adhesive in the bores 14. Preferably, with the preferred type of epoxy adhesive the oven should be at a temperature of about 150° C., although the curing temperature will depend on the particular type of adhesive used. The apparatus is then removed from the oven and the connectors are removed from the apparatus. In alternative embodiments, the adhesive may be cured by other suitable curing techniques, such as, for example, UV and the like.

Figure 8:
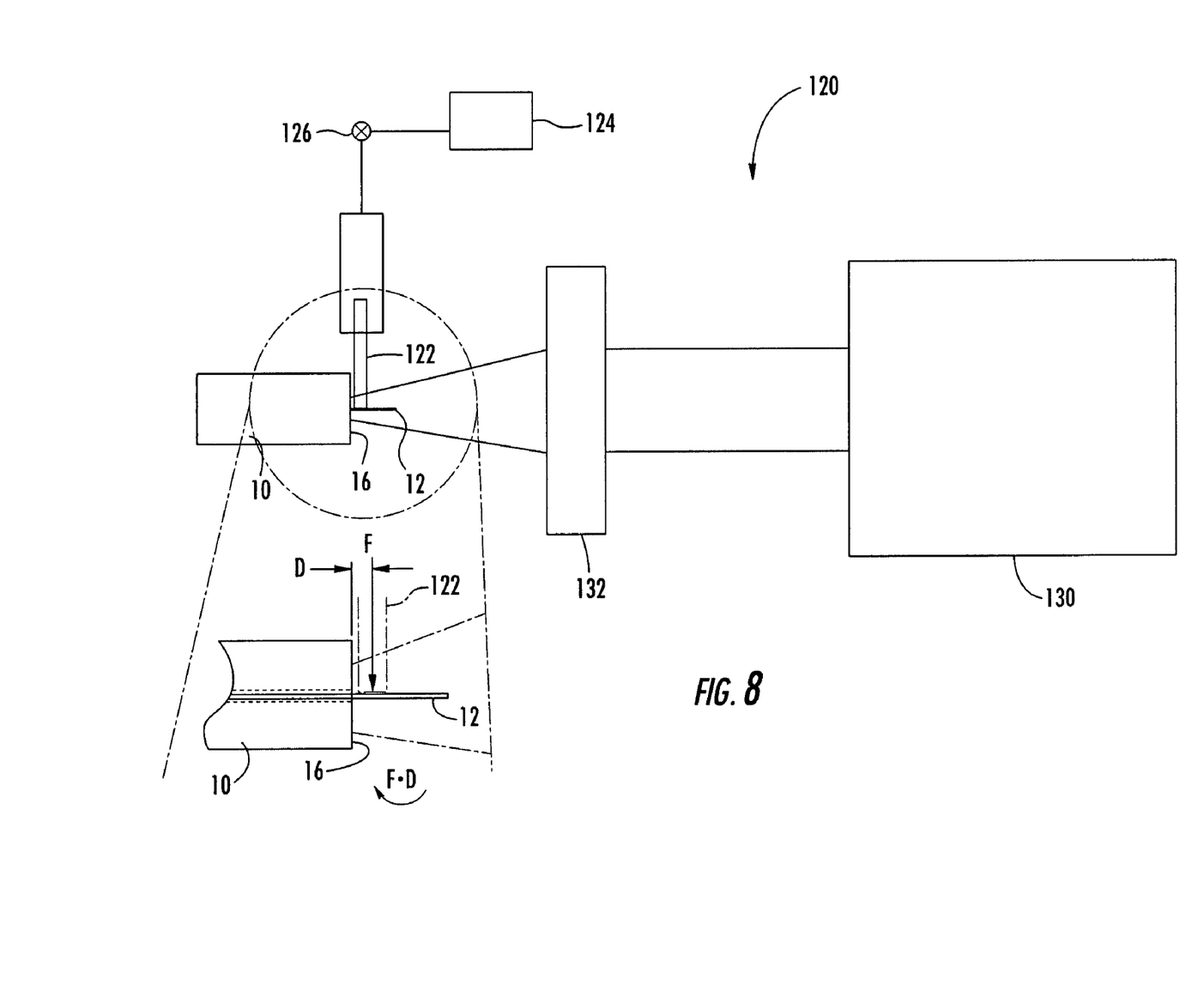
FIG. 8 is a schematic diagram of an apparatus for positioning an optical fiber in a passageway using an air jet in accordance with an embodiment of this invention.
Figure 9:
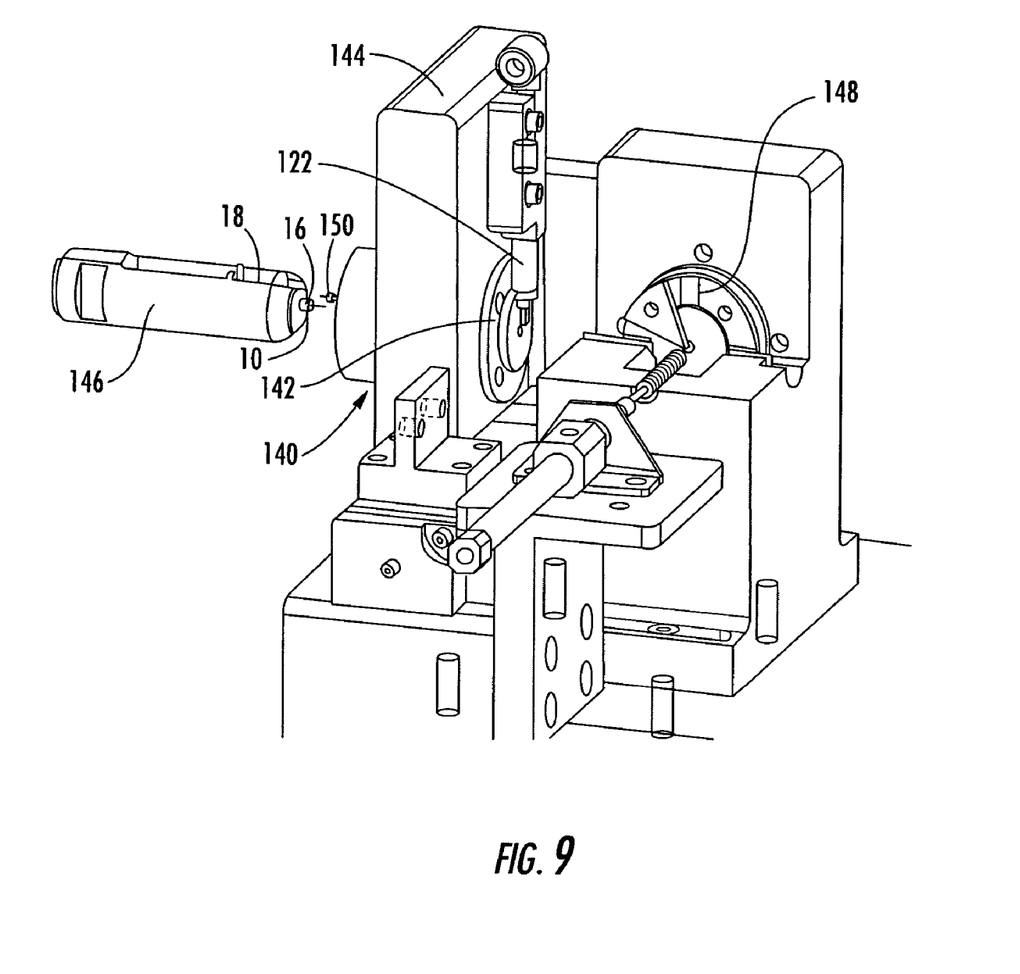
FIG. 9 is a perspective view of an apparatus for positioning an optical fiber using an air jet in accordance with an embodiment of this invention.
Figure 10:
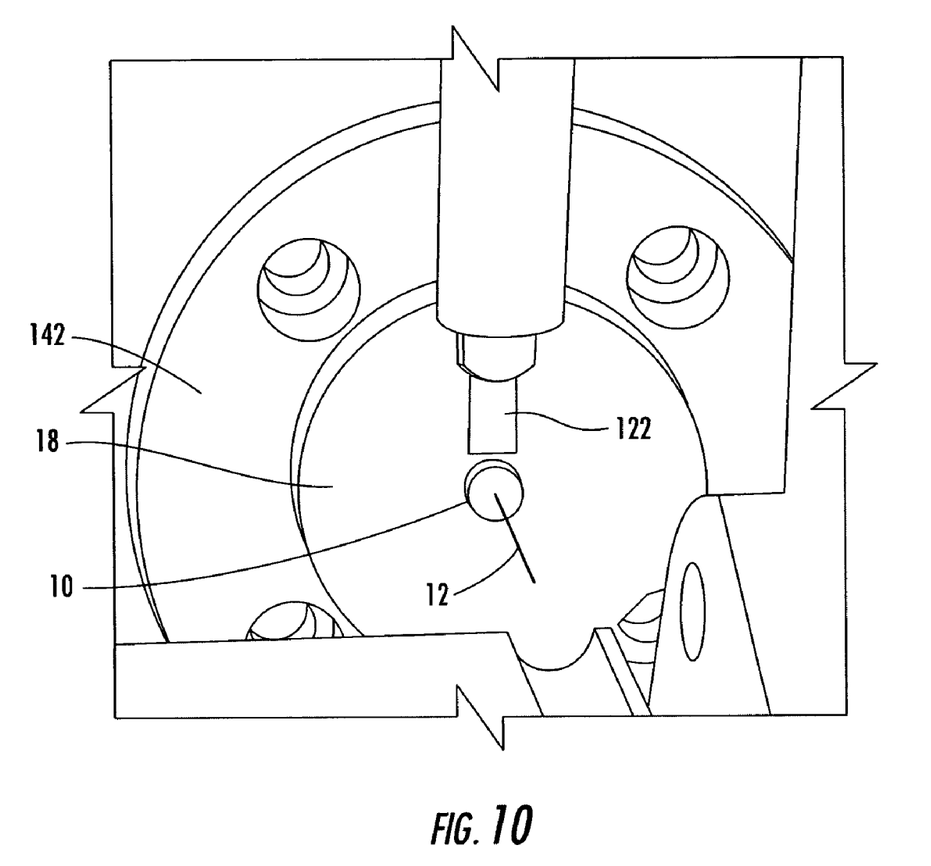
FIG. 10 is a partial enlarged perspective view of a portion of the apparatus of FIG. 9, showing an optical fiber optic connector mounted in the apparatus.

FIGS. 8–10 depict an alternative embodiment of an apparatus in accordance with the invention. In this embodiment, the force for positioning the optical fiber 12 in the bore 14 of the ferrule 10 is provided by a directing a pressurized fluid or gas onto at least a portion of the optical fiber. FIG. 8 diagrammatically illustrates the apparatus 120. The apparatus includes a nozzle 122 supplied with pressurized fluid from a suitable source 124 via a controllable shutoff valve 126. Preferably, the fluid comprises air; however, alternate embodiments may use other suitable fluids. The nozzle 122 is positioned such that a tip of the nozzle from which the fluid is discharged is closely adjacent to the optical fiber 12 and the end face 16, such that the jet of fluid produced by the nozzle is directed substantially orthogonal to the axial direction of the optical fiber 12. Preferably, the fluid jet should impinge on the optical fiber 12 at a location spaced no more than at least about 0.5 to 1.0 mm from the end face 16 of the ferrule 10. The pressurized air supply 124 preferably has a plenum pressure of about 5 to 15 psig.

The discharge orifice of the nozzle 122 preferably is not circular, but rather is elongated in a direction transverse to the optical fiber axial direction to produce a thin stream of air. In the preferred embodiment, the nozzle discharge orifice is an oval in which the longer sides of the oval have a length of at least about 0.8 mm and the width of the orifice (i.e., the spacing between the straight sides) is at least about 0.5 mm.

The jet of air from the nozzle 122 pushes the optical fiber 12 to the lower side 13 of the bore 14 in the ferrule 10. Once the optical fiber 12 has been positioned in the bore 14, a beam of laser radiation from a laser 130 is directed, via a focusing lens 132, onto a portion of the end face 16 surrounding the optical fiber so as to locally heat the ferrule or the adhesive at the end face 16. This causes the adhesive in at least a portion of the bore 14 adjacent the end face 16 to be cured, or at least partially cured, so as to tack the optical fiber 12 in place at the desired position in the bore 14. The connector is then put into an oven or is otherwise heated to a suitable curing temperature for a sufficient time to completely cure the adhesive along the entire length of the bore 14. As noted previously, with the preferred type of epoxy adhesive a suitable curing temperature is about 150° C.

The laser 130 preferably is controllable to regulate the intensity of heating of the ferrule or the adhesive so as to produce a desired temperature of the ferrule at the end face 16. The laser 130 can be calibrated so that the relationship between the power of the laser radiation and the temperature at the end face are known, and then the power of the laser can be regulated to produce the desired temperature. Preferably, the temperature at the end face is about 150° C., but it will be recognized that different adhesives may require different temperatures to sufficiently cure the adhesive to tack the optical fiber 12 in place.

FIG. 9 depicts a fixture 140 in accordance with the invention for securing a connector in position to be operated on by the air jet from the nozzle 122. The fixture 140 includes at least one receptacle 142 extending through a wall 144 of the fixture for receiving a connector. A holding structure called a "bullet" 146 supports the connector and is positioned in the receptacle 142 from left to right as shown by arrow 150 such that the end face 16 of the ferrule 10 with fiber 12 projects from the receptacle on the right as shown in further detail in FIG. 10. The air nozzle 122 is mounted to the fixture 140 with a tip of the nozzle positioned so that it is in close proximity to the optical fiber 12 projecting from the ferrule 10 of the connector and in close proximity to the end face 16 of the ferrule. FIG. 10 illustrates the position of the nozzle relative to the optical fiber 12 and ferrule 10.

The fixture 140, as shown in FIG. 9, also advantageously may include a second receptacle 148 for receiving the connector after the optical fiber 12 has been secured in place in the bore 14 of the ferrule 10 by curing the adhesive. The second receptacle 148 positions the connector so that the end portion of the optical fiber projecting from the ferrule 10 can be cut off by a cut-off device (not shown) in preparation for polishing of the end face 16 and optical fiber 12. Of course, it will be recognized that a fixture in accordance with the invention could include a plurality of receptacles and a plurality of air nozzles associated with each receptacle so that multiple connectors can be processed simultaneously, and could include a plurality of receptacles for positioning multiple connectors to have the optical fiber ends cut off.

Further, this invention may make use of a method and apparatus that provide a work station incorporating at least one of the following: (1) fiber placement into the passageway of a ferrule, (2) adhesive injection into the passageway of the ferrule, (3) fiber positioning in such a way as to compensate for eccentricity of the passageway relative to the longitudinal centroidal axis of ferrule such that the optical fiber position relative to the passageway is substantially straight for a predetermined distance, (4) tacking the end portion of the fiber to the end face of the ferrule, (5) curing the adhesive in the passageway of the ferrule, (6) cutting off the end portion of the fiber projecting from the end face of the ferrule, and (7) polishing the end face of the ferrule and optical fiber. Finally, this invention includes optic fiber assemblies that incorporated ferrules or connectors made from the various embodiments described herein.

Many modifications and other embodiments of the invention will come to mind to one skilled in the art to which this invention pertains having the benefit of the teachings presented in the foregoing descriptions and the associated drawings. For example, the embodiments discussed herein are directed to a ferrule having a centralized bore for a passageway. However, the positioning method and apparatus apply to ferrules having other types of passageways, such as, for example, ferrules with non-encapsulated or partially encapsulated passageways, such as channels and grooves. Another modification or embodiment, for example, may include other means for applying the force to the optical fiber can be used, such as a thin wire placed in tension and bearing against the optical fiber. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for positioning an optical fiber within a passageway of a ferrule, comprising:
 a holder configured to receive and support the ferrule, wherein the ferrule has a longitudinally extending passageway and wherein the optical fiber has a diameter less than that of the passageway, the holder positioning the ferrule such that the optical fiber has an end portion projecting out from the passageway beyond an end face of the ferrule;
 an adhesive application mechanism capable of disposing a fluid adhesive between the optical fiber and an inner surface of the passageway; and
 a force mechanism for imposing a force F on the end portion of the optical fiber projecting from the ferrule, wherein the force moves the end portion of the optical fiber to a desired position in the passageway and wherein the force F is imposed at a distance D from the ferrule end face such that a resulting moment F·D on the optical fiber maintains the optical fiber straight within at least about 0.05 μm for a distance of at least about 50 μm from the ferrule end face into the passageway.

2. An apparatus for positioning an optical fiber within a passageway of a ferrule, comprising:
 a holder configured to receive and support the ferrule, wherein the ferrule has a longitudinally extending passageway and wherein the optical fiber has a diameter less than that of the passageway, the holder positioning the ferrule such that the optical fiber has an end portion projecting out from the passageway beyond an end face of the ferrule;
 an adhesive application mechanism capable of disposing a fluid adhesive between the optical fiber and an inner surface of the passageway; and
 a nozzle operable to discharge a jet of fluid generally orthogonal to the longitudinal axis of the optical fiber so as to move the end portion of the optical fiber to a desired position in the passageway.

3. The apparatus of claim 2, wherein the nozzle discharges a jet of air onto the optical fiber.

4. The apparatus of claim 3, wherein the nozzle is positioned to discharge the jet of air onto the optical fiber closely adjacent to the end face.

5. The apparatus of claim 4, further comprising:
 a heating device for heating the ferrule at the end face thereof so as to at least partially cure the adhesive and thereby tack the optical fiber in the desired position in the passageway.

6. The apparatus of claim 5, wherein the heating device comprises a laser.

7. The apparatus of claim 6, wherein the laser is arranged to impinge a laser beam onto the end face.

8. The apparatus of claim 7, wherein the laser is arranged such that the laser beam is directed generally orthogonal to the end face.

* * * * *